(12) United States Patent
Youssefi

(10) Patent No.: US 9,024,680 B2
(45) Date of Patent: May 5, 2015

(54) EFFICIENCY FOR CHARGE PUMPS WITH LOW SUPPLY VOLTAGES

(71) Applicant: SanDisk Technologies Inc., Plano, TX (US)

(72) Inventor: Behdad Youssefi, Santa Clara, CA (US)

(73) Assignee: SanDisk Technologies Inc., Plano, TX (US)

( * ) Notice: Subject to any disclaimer, the term of this patent is extended or adjusted under 35 U.S.C. 154(b) by 0 days.

(21) Appl. No.: 13/924,875

(22) Filed: Jun. 24, 2013

(65) Prior Publication Data

US 2014/0375378 A1    Dec. 25, 2014

(51) Int. Cl.
  *G05F 3/16* (2006.01)
  *H02M 3/18* (2006.01)
(52) U.S. Cl.
  CPC ....................................... *H02M 3/18* (2013.01)
(58) Field of Classification Search
  None
  See application file for complete search history.

(56) References Cited

U.S. PATENT DOCUMENTS

| | | |
|---|---|---|
| 3,697,860 A | 10/1972 | Baker |
| 4,511,811 A | 4/1985 | Gupta |
| 4,583,157 A | 4/1986 | Kirsch et al. |
| 4,636,748 A | 1/1987 | Latham, II |
| 4,736,121 A | 4/1988 | Cini et al. |
| 4,888,738 A | 12/1989 | Wong et al. |
| 5,140,182 A | 8/1992 | Ichimura |
| 5,168,174 A | 12/1992 | Naso et al. |
| 5,175,706 A | 12/1992 | Edme |
| 5,263,000 A | 11/1993 | Van Buskirk et al. |
| 5,392,205 A | 2/1995 | Zavaleta |
| 5,436,587 A | 7/1995 | Cernea |
| 5,483,434 A | 1/1996 | Seesink |
| 5,508,971 A | 4/1996 | Cernea et al. |
| 5,521,547 A | 5/1996 | Tsukada |
| 5,539,351 A | 7/1996 | Gilsdorf et al. |
| 5,563,779 A | 10/1996 | Cave et al. |
| 5,563,825 A | 10/1996 | Cernea et al. |
| 5,568,424 A | 10/1996 | Cernea et al. |
| 5,570,315 A | 10/1996 | Tanaka et al. |

(Continued)

FOREIGN PATENT DOCUMENTS

| | | |
|---|---|---|
| DE | 10 2007 026290 | 7/2008 |
| EP | 0 382 929 A | 8/1990 |

(Continued)

OTHER PUBLICATIONS

Feng Pan et al., "Charge Pump Circuit Design", McGraw-Hill, 2006, 26 pages, 2006.

(Continued)

*Primary Examiner* — Lincoln Donovan
*Assistant Examiner* — Terry L Englund
(74) *Attorney, Agent, or Firm* — Davis Wright Tremaine LLP

(57) ABSTRACT

A charge pump system uses a helper pump to use in generating a boosted clock signal to use for a capacitor of a stage of a charge pump and also for the gate clock of the stage. This can be particularly useful in applications with lower supply levels, where the helper pump can be used to provide an amplitude higher than the supply level, that can then be added to the supply level for the boosted clock signal and then added again to the supply level for the gate clock. Further advantages can be obtained by using the helper or auxiliary pump as an input to an optimized inverter circuit that receives an input clock and has an output that initially rises to the supply level then subsequently to the auxiliary pump's level.

7 Claims, 3 Drawing Sheets

(56) References Cited

U.S. PATENT DOCUMENTS

| | | | |
|---|---|---|---|
| 5,592,420 A | 1/1997 | Cernea et al. | |
| 5,596,532 A | 1/1997 | Cernea et al. | |
| 5,602,794 A | 2/1997 | Javanifard et al. | |
| 5,621,685 A | 4/1997 | Cernea et al. | |
| 5,625,544 A | 4/1997 | Kowshik et al. | |
| 5,693,570 A | 12/1997 | Cernea et al. | |
| 5,732,039 A | 3/1998 | Javanifard et al. | |
| 5,734,286 A | 3/1998 | Takeyama et al. | |
| 5,767,735 A | 6/1998 | Javanifard et al. | |
| 5,781,473 A | 7/1998 | Javanifard et al. | |
| 5,801,987 A | 9/1998 | Dinh | |
| 5,818,766 A | 10/1998 | Song | |
| 5,828,596 A | 10/1998 | Takata et al. | |
| 5,903,495 A | 5/1999 | Takeuchi et al. | |
| 5,943,226 A | 8/1999 | Kim | |
| 5,945,870 A | 8/1999 | Chu et al. | |
| 5,969,565 A | 10/1999 | Naganawa | |
| 5,969,988 A | 10/1999 | Tanzawa et al. | |
| 5,973,546 A | 10/1999 | Le et al. | |
| 5,982,222 A | 11/1999 | Kyung | |
| 6,008,690 A | 12/1999 | Takeshima et al. | |
| 6,016,073 A | 1/2000 | Ghilardelli et al. | |
| 6,018,264 A | 1/2000 | Jin | |
| 6,023,187 A | 2/2000 | Camacho et al. | |
| 6,026,002 A | 2/2000 | Viehmann | |
| 6,046,935 A | 4/2000 | Takeuchi et al. | |
| 6,104,225 A | 8/2000 | Taguchi et al. | |
| 6,107,862 A | 8/2000 | Mukainakano et al. | |
| 6,134,145 A | 10/2000 | Wong | |
| 6,147,566 A | 11/2000 | Pizzuto et al. | |
| 6,151,229 A | 11/2000 | Taub et al. | |
| 6,154,088 A | 11/2000 | Chevallier et al. | |
| 6,157,242 A * | 12/2000 | Fukui | 327/536 |
| 6,188,590 B1 | 2/2001 | Chang et al. | |
| 6,198,645 B1 | 3/2001 | Kotowski et al. | |
| 6,208,198 B1 | 3/2001 | Lee | |
| 6,249,445 B1 | 6/2001 | Sugasawa | |
| 6,249,898 B1 | 6/2001 | Koh et al. | |
| 6,275,096 B1 | 8/2001 | Hsu et al. | |
| 6,278,294 B1 | 8/2001 | Taniguchi | |
| 6,285,622 B1 | 9/2001 | Haraguchi et al. | |
| 6,297,687 B1 | 10/2001 | Sugimura | |
| 6,307,425 B1 | 10/2001 | Chevallier et al. | |
| 6,314,025 B1 | 11/2001 | Wong | |
| 6,320,428 B1 | 11/2001 | Atsumi et al. | |
| 6,320,796 B1 | 11/2001 | Voo et al. | |
| 6,329,869 B1 | 12/2001 | Matano | |
| 6,344,959 B1 | 2/2002 | Milazzo | |
| 6,344,984 B1 | 2/2002 | Miyazaki | |
| 6,356,062 B1 | 3/2002 | Elmhurst et al. | |
| 6,359,798 B1 | 3/2002 | Han et al. | |
| 6,369,642 B1 | 4/2002 | Zeng et al. | |
| 6,370,075 B1 | 4/2002 | Haeberli et al. | |
| 6,385,107 B1 | 5/2002 | Bedarida et al. | |
| 6,400,202 B1 | 6/2002 | Fifield et al. | |
| 6,404,274 B1 | 6/2002 | Hosono et al. | |
| 6,411,157 B1 | 6/2002 | Hsu et al. | |
| 6,424,570 B1 | 7/2002 | Le et al. | |
| 6,445,243 B2 | 9/2002 | Myono | |
| 6,456,164 B1 | 9/2002 | Fan | |
| 6,456,170 B1 | 9/2002 | Segawa et al. | |
| 6,476,666 B1 | 11/2002 | Palusa et al. | |
| 6,486,728 B2 | 11/2002 | Kleveland | |
| 6,518,830 B2 | 2/2003 | Gariboldi et al. | |
| 6,522,191 B1 | 2/2003 | Cha et al. | |
| 6,525,614 B2 | 2/2003 | Tanimoto | |
| 6,525,949 B1 | 2/2003 | Johnson et al. | |
| 6,531,792 B2 | 3/2003 | Oshio | |
| 6,538,930 B2 | 3/2003 | Ishii et al. | |
| 6,545,529 B2 | 4/2003 | Kim | |
| 6,556,465 B2 | 4/2003 | Haeberli et al. | |
| 6,577,535 B2 | 6/2003 | Pasternak | |
| 6,606,267 B2 | 8/2003 | Wong | |
| 6,661,682 B2 * | 12/2003 | Kim et al. | 363/59 |
| 6,703,891 B2 * | 3/2004 | Tanaka | 327/536 |
| 6,724,241 B1 | 4/2004 | Bedarida et al. | |
| 6,734,718 B1 | 5/2004 | Pan | |
| 6,737,907 B2 | 5/2004 | Hsu et al. | |
| 6,760,262 B2 | 7/2004 | Haeberli et al. | |
| 6,762,640 B2 | 7/2004 | Katsuhisa | |
| 6,781,440 B2 | 8/2004 | Huang | |
| 6,798,274 B2 | 9/2004 | Tanimoto | |
| 6,819,162 B2 | 11/2004 | Pelliconi | |
| 6,834,001 B2 | 12/2004 | Myono | |
| 6,859,091 B1 | 2/2005 | Nicholson et al. | |
| 6,878,981 B2 | 4/2005 | Eshel | |
| 6,891,764 B2 | 5/2005 | Li | |
| 6,894,554 B2 | 5/2005 | Ito | |
| 6,922,096 B2 | 7/2005 | Cernea | |
| 6,927,441 B2 | 8/2005 | Pappalardo et al. | |
| 6,933,768 B2 | 8/2005 | Hausmann | |
| 6,944,058 B2 | 9/2005 | Wong | |
| 6,954,386 B2 | 10/2005 | Narui et al. | |
| 6,975,135 B1 | 12/2005 | Bui | |
| 6,985,397 B2 | 1/2006 | Tokui et al. | |
| 6,990,031 B2 | 1/2006 | Hashimoto et al. | |
| 6,995,603 B2 | 2/2006 | Chen et al. | |
| 7,002,381 B1 | 2/2006 | Chung | |
| 7,023,260 B2 | 4/2006 | Thorp et al. | |
| 7,030,683 B2 | 4/2006 | Pan et al. | |
| 7,092,263 B2 * | 8/2006 | Chang | 363/59 |
| 7,113,023 B2 | 9/2006 | Cernea | |
| 7,116,154 B2 | 10/2006 | Guo | |
| 7,116,155 B2 | 10/2006 | Pan | |
| 7,120,051 B2 | 10/2006 | Gorobets et al. | |
| 7,123,078 B2 | 10/2006 | Seo | |
| 7,129,538 B2 | 10/2006 | Lee et al. | |
| 7,129,759 B2 | 10/2006 | Fukami | |
| 7,135,910 B2 | 11/2006 | Cernea | |
| 7,135,911 B2 | 11/2006 | Imamiya | |
| 7,205,682 B2 | 4/2007 | Kuramori | |
| 7,208,996 B2 | 4/2007 | Suzuki et al. | |
| 7,215,179 B2 * | 5/2007 | Yamazoe et al. | 327/537 |
| 7,224,591 B2 | 5/2007 | Kaishita et al. | |
| 7,227,780 B2 | 6/2007 | Komori et al. | |
| 7,239,192 B2 | 7/2007 | Tailliet | |
| 7,253,675 B2 | 8/2007 | Aksin et al. | |
| 7,253,676 B2 | 8/2007 | Fukuda et al. | |
| 7,259,612 B2 | 8/2007 | Saether | |
| 7,276,960 B2 | 10/2007 | Peschke | |
| 7,279,957 B2 | 10/2007 | Yen | |
| 7,345,928 B2 | 3/2008 | Li | |
| 7,348,829 B2 | 3/2008 | Choy et al. | |
| 7,368,979 B2 | 5/2008 | Govindu et al. | |
| 7,397,677 B1 | 7/2008 | Collins et al. | |
| 7,468,628 B2 | 12/2008 | Im et al. | |
| 7,495,500 B2 | 2/2009 | Al-Shamma et al. | |
| 7,521,978 B2 | 4/2009 | Kim et al. | |
| 7,554,311 B2 | 6/2009 | Pan | |
| 7,579,902 B2 | 8/2009 | Frulio et al. | |
| 7,579,903 B2 | 8/2009 | Oku | |
| 7,602,233 B2 | 10/2009 | Pietri et al. | |
| 7,667,529 B2 | 2/2010 | Consuelo et al. | |
| 7,671,572 B2 | 3/2010 | Chung | |
| 7,696,812 B2 | 4/2010 | Al-Shamma et al. | |
| 7,772,914 B2 | 8/2010 | Jung | |
| 7,795,952 B2 | 9/2010 | Lui et al. | |
| 7,830,203 B2 | 11/2010 | Chang et al. | |
| 7,928,796 B2 | 4/2011 | Namekawa | |
| 7,944,277 B1 | 5/2011 | Sinitsky et al. | |
| 7,956,675 B2 | 6/2011 | Saitoh et al. | |
| 8,040,174 B2 | 10/2011 | Likhterov | |
| 8,093,953 B2 | 1/2012 | Pierdomineco et al. | |
| 8,159,091 B2 | 4/2012 | Yeates | |
| 8,193,853 B2 | 6/2012 | Hsieh et al. | |
| 8,242,834 B2 | 8/2012 | Chuang et al. | |
| 8,339,183 B2 | 12/2012 | Htoo et al. | |
| 8,395,440 B2 | 3/2013 | Shandhu et al. | |
| 8,604,868 B2 | 12/2013 | Ucciardello et al. | |
| 8,643,358 B2 | 2/2014 | Yoon | |
| 2002/0008566 A1 | 1/2002 | Taito et al. | |
| 2002/0014908 A1 | 2/2002 | Lauterbach | |
| 2002/0075063 A1 | 6/2002 | Hwang | |
| 2002/0075706 A1 | 6/2002 | Foss et al. | |

(56) References Cited

U.S. PATENT DOCUMENTS

| | | |
|---|---|---|
| 2002/0130701 A1 | 9/2002 | Kleveland |
| 2002/0130704 A1 | 9/2002 | Myono et al. |
| 2002/0140463 A1 | 10/2002 | Cheung |
| 2003/0128560 A1 | 7/2003 | Saiki et al. |
| 2003/0214346 A1 | 11/2003 | Pelliconi |
| 2004/0046603 A1 | 3/2004 | Bedarida et al. |
| 2005/0024125 A1 | 2/2005 | McNitt et al. |
| 2005/0030088 A1 | 2/2005 | Cernea |
| 2005/0093614 A1 | 5/2005 | Lee |
| 2005/0195017 A1 | 9/2005 | Chen et al. |
| 2005/0237103 A1 | 10/2005 | Cernea |
| 2005/0248386 A1 | 11/2005 | Pan et al. |
| 2006/0114053 A1 | 6/2006 | Sohara et al. |
| 2006/0119393 A1 | 6/2006 | Hua et al. |
| 2006/0244518 A1 | 11/2006 | Byeon et al. |
| 2006/0250177 A1 | 11/2006 | Thorp et al. |
| 2007/0001745 A1 | 1/2007 | Yen |
| 2007/0053216 A1 | 3/2007 | Alenin |
| 2007/0069805 A1 | 3/2007 | Choi et al. |
| 2007/0126494 A1 | 6/2007 | Pan |
| 2007/0139099 A1 | 6/2007 | Pan |
| 2007/0139100 A1 | 6/2007 | Pan |
| 2007/0210853 A1 | 9/2007 | Maejima |
| 2007/0211502 A1 | 9/2007 | Komiya |
| 2007/0222498 A1 | 9/2007 | Choy et al. |
| 2007/0229149 A1 | 10/2007 | Pan et al. |
| 2008/0024096 A1 | 1/2008 | Pan |
| 2008/0024198 A1 | 1/2008 | Bitonti et al. |
| 2008/0042731 A1 | 2/2008 | Daga et al. |
| 2008/0111604 A1 | 5/2008 | Boerstler et al. |
| 2008/0116963 A1 | 5/2008 | Jung |
| 2008/0136500 A1 | 6/2008 | Frulio et al. |
| 2008/0157852 A1 | 7/2008 | Pan |
| 2008/0157859 A1 | 7/2008 | Pan |
| 2008/0218134 A1 | 9/2008 | Kawakami et al. |
| 2008/0239802 A1 | 10/2008 | Thorp et al. |
| 2008/0239856 A1 | 10/2008 | Thorp et al. |
| 2008/0278222 A1 | 11/2008 | Conti et al. |
| 2008/0307342 A1 | 12/2008 | Furches et al. |
| 2009/0033306 A1 | 2/2009 | Tanzawa |
| 2009/0051413 A1 | 2/2009 | Chu et al. |
| 2009/0058506 A1 | 3/2009 | Nandi et al. |
| 2009/0058507 A1 | 3/2009 | Nandi et al. |
| 2009/0091366 A1 | 4/2009 | Baek et al. |
| 2009/0121780 A1 | 5/2009 | Chen et al. |
| 2009/0153230 A1 | 6/2009 | Pan et al. |
| 2009/0153231 A1 | 6/2009 | Pan et al. |
| 2009/0153232 A1 | 6/2009 | Fort et al. |
| 2009/0167418 A1 | 7/2009 | Raghavan |
| 2009/0174441 A1 | 7/2009 | Gebara et al. |
| 2009/0184697 A1 | 7/2009 | Park |
| 2009/0219077 A1 | 9/2009 | Pietri et al. |
| 2009/0315598 A1 | 12/2009 | Namekawa |
| 2009/0315616 A1 | 12/2009 | Nguyen et al. |
| 2009/0322413 A1 | 12/2009 | Huynh et al. |
| 2010/0019832 A1 | 1/2010 | Pan |
| 2010/0033232 A1 | 2/2010 | Pan |
| 2010/0074034 A1 | 3/2010 | Cazzaniga |
| 2010/0085794 A1 | 4/2010 | Chen et al. |
| 2010/0118625 A1 | 5/2010 | Matano |
| 2010/0127761 A1 | 5/2010 | Matano |
| 2010/0244935 A1 | 9/2010 | Kim et al. |
| 2010/0302877 A1 | 12/2010 | Bang |
| 2011/0026329 A1 | 2/2011 | Wada |
| 2011/0133821 A1 | 6/2011 | Honda |
| 2011/0156803 A1 | 6/2011 | Yap et al. |
| 2011/0176370 A1 | 7/2011 | Izumi et al. |
| 2011/0254615 A1 | 10/2011 | Raghunathan et al. |
| 2012/0230071 A1 | 9/2012 | Kaneda |
| 2013/0162229 A1 | 6/2013 | Chan |

FOREIGN PATENT DOCUMENTS

| | | |
|---|---|---|
| EP | 0 780 515 A | 6/1997 |
| JP | 2007-020268 | 1/2007 |
| WO | 01/06336 A1 | 1/2001 |
| WO | WO 2006/132757 | 12/2006 |

OTHER PUBLICATIONS

Louie Pylarinos et al., "Charge Pumps: An Overview", Department of Electrical and Computer Engineering University of Toronto, 7 pages.

Ang et al., "An On-Chip Voltage Regulator Using Switched Decoupling Capacitors," 2000 IEEE International Solid-State Circuits Conference, 2 pages.

U.S. Appl. No. 12/506,998 entitled "Charge Pump with Current Based Regulation" filed Jul. 21, 2009, 21 pages.

U.S. Appl. No. 12/634,385 entitled "Multi-Stage Charge Pump with Variable Number of Boosting Stages" filed Dec. 9, 2009, 33 pages.

\* cited by examiner

Charging Half Cycle

Transfer Half Cycle

EFFICIENCY FOR CHARGE PUMPS WITH LOW SUPPLY VOLTAGES

FIELD OF THE INVENTION

This invention pertains generally to the field of charge pumps and more particularly to improving their efficiency.

BACKGROUND

Charge pumps use a switching process to provide a DC output voltage larger or lower than its DC input voltage. In general, a charge pump will have a capacitor coupled to switches between an input and an output. During one clock half cycle, the charging half cycle, the capacitor couples in parallel to the input so as to charge up to the input voltage. During a second clock cycle, the transfer half cycle, the charged capacitor couples in series with the input voltage so as to provide an output voltage twice the level of the input voltage. This process is illustrated in FIGS. 1a and 1b. In FIG. 1a, the capacitor 5 is arranged in parallel with the input voltage $V_{IN}$ to illustrate the charging half cycle. In FIG. 1b, the charged capacitor 5 is arranged in series with the input voltage to illustrate the transfer half cycle. As seen in FIG. 1b, the positive terminal of the charged capacitor 5 will thus be $2*V_{IN}$ with respect to ground.

Charge pumps are used in many contexts. For example, they are used as peripheral circuits on flash and other non-volatile memories to generate many of the needed operating voltages, such as programming or erase voltages, from a lower power supply voltage. A number of charge pump designs, such as conventional Dickson-type pumps, are known in the art. FIG. 2 shows a 2 stage, 2 branch version of a conventional Dickson type charge pump that receives Vcc as its input voltage on the left and generates from it an output voltage on the right. The top branch has a pair of capacitors 303 and 307 with top plates connected along the branch and bottom plates respectively connected to the non-overlapping clock signals CLK1 and CLK2. The capacitors 303 and 307 are connected between the series of transistors 301, 305, and 309, which are all diode connected to keep the charge from flowing back to the left. The bottom branch is constructed of transistors 311, 315, and 319 and capacitors 313 and 317 arranged in the same manner as the top branch, but with the clocks reversed so the two branches will alternately drive the output. As devices mover to lower supply levels, however, it becomes increasing difficult to provide the desired output level from the available Vcc level efficiently.

SUMMARY OF THE INVENTION

According to a first set of aspects, a charge pump system has one or more pump stages each having an input and an output and connected in series to receive an input voltage at the initial stage of the series and provide an output voltage at the final stage of the series. A first of the stages includes: a transistor connected between the input and output of the first stage; a first capacitor having a first plate connected to a node between the input of the first a stage and the transistor and a second plate connected to receive a boosted clock signal; and a gate capacitor having a first plate connected to the gate of the transistor and a second plate connected to receive a gate clock signal. The charge pump system also includes clock generation circuitry connected to receive an input clock and a supply voltage and to generate therefrom the boosted clock signal and the gate clock signal. The clock generation circuitry includes an auxiliary charge pump circuitry whose output is used in generating the boosted clock signal and the gate clock signal.

Various aspects, advantages, features and embodiments of the present invention are included in the following description of exemplary examples thereof, which description should be taken in conjunction with the accompanying drawings. All patents, patent applications, articles, other publications, documents and things referenced herein are hereby incorporated herein by this reference in their entirety for all purposes. To the extent of any inconsistency or conflict in the definition or use of terms between any of the incorporated publications, documents or things and the present application, those of the present application shall prevail.

BRIEF DESCRIPTION OF THE DRAWINGS

The various aspects and features of the present invention may be better understood by examining the following figures, in which.

DETAILED DESCRIPTION

As discussed in the Background section, charge pump circuits can be used to generate voltages needed on a circuit that are higher than what is available from the power supply. As designs move towards lower supply levels (such as VCC in the 1.55-2.1V range), this typically places greater demands on charge pump systems to provide the desired voltage levels. One way of dealing with this (see, for example, U.S. Pat. No. 6,370,075 in this regard) is to increase the number of pumps stages; however, this approach can have a number of drawbacks. The situation can be considered with respect to FIG. 3

Figure 1A:
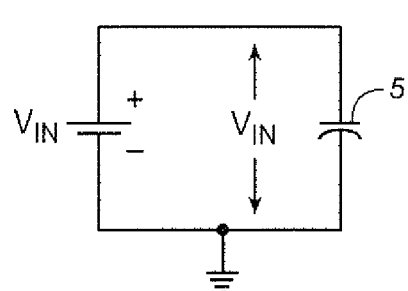
FIG. 1a is a simplified circuit diagram of the charging half cycle in a generic charge pump.
Figure 1B:
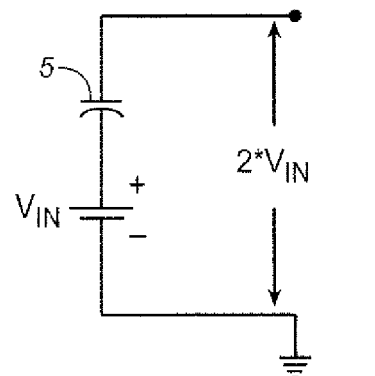
FIG. 1b is a simplified circuit diagram of the transfer half cycle in a generic charge pump.
Figure 2:
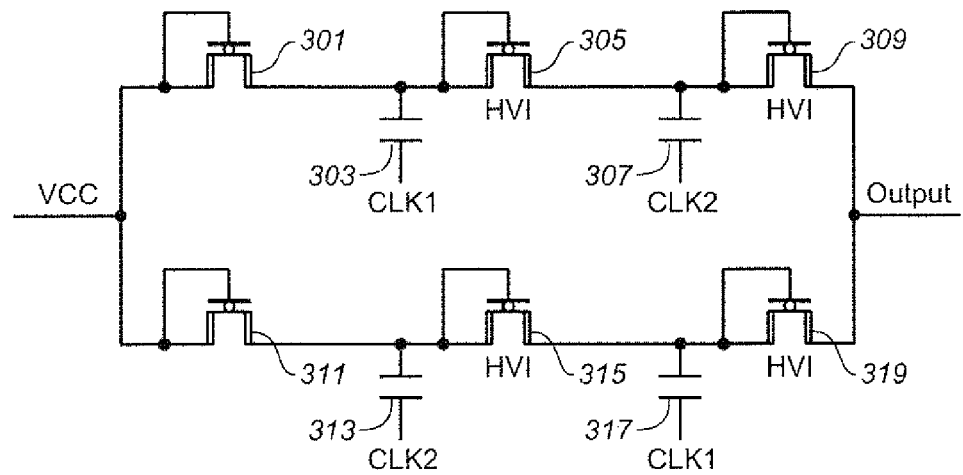
FIG. 2 shows a 2 stage, 2 branch version of a conventional Dickson type charge pump.
Figure 3:
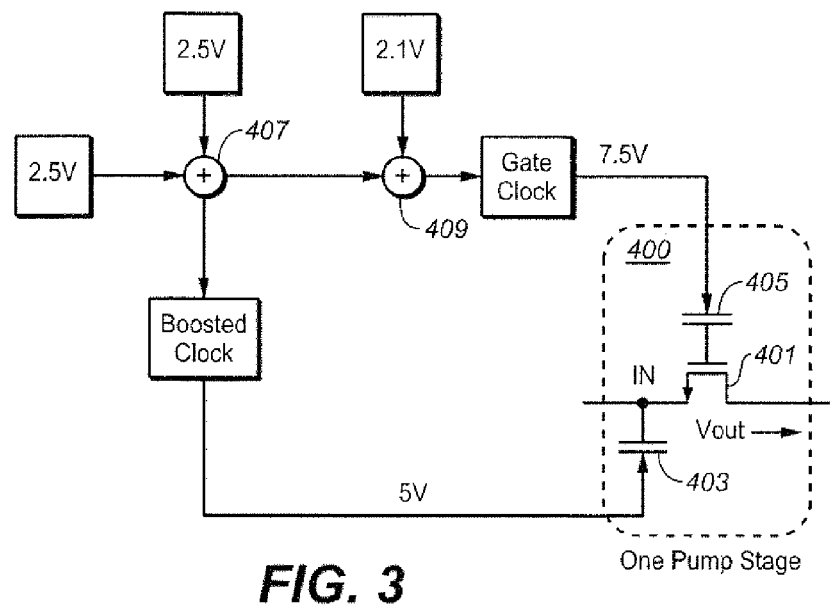
FIG. 3 is a schematic representation of an example of stage in a charge pump and associated clock generating circuitry.

FIG. 3 schematically illustrates one stage 400 of a charge pump, which could be one of the stages of a Dickson type pump such as illustrated in FIG. 2, and some of its associated clock generating circuitry. The stage 400 includes the transistor 401 and the capacitor 403 connected on one side at the input side of the stage. In this example, rather than have the transistor 401 connected as a diode (as for the stages in FIG. 2), the stage uses threshold voltage (Vth) cancellation arrangement, where the gate of 401 is connected to a plate of the capacitor 405. In this example, the Vcc level is taken as Vcc=2.5V. As schematically represented in FIG. 3, clock signals of this amplitude can be added at 407 to generate a boosted clock signal of 5V that is supplied to the stage's capacitor 403. The boosted clock signal is then further boosted by the Vcc level to provide a gate clock signal of 7.5V (in this example) for the gate capacitor 405, where the higher voltage of the gate clock is used to cancel out the threshold voltage of the transistor 401 and allow the level at the input side to pass to Vout. The adders 407 and 409 can be implemented by use of flying capacitors, for example. Other stages of the pump can be formed and clocked similarly, with clocks phased accordingly.

The example of FIG. 3 used a value of Vcc=2.5. For lower supply levels, such as a Vcc 1.5-2.1V, it can be difficult for the same pump arrangement to meet the needed specifications for its output. The conventional way to solve this problem is to increase the number of stages and size them up accordingly, so that the pump can have the same output impedance as the original design. However, the adding and sizing up of stages requires the use of a relatively large area and also consumes more power due to a higher parasitic capacitance. The following presents techniques for efficiently maintaining output performance even with lower supply levels.

More information on prior art charge pumps, such as Dickson type pumps, and charge pumps generally, can be found, for example, in "Charge Pump Circuit Design" by Pan and Samaddar, McGraw-Hill, 2006, or "Charge Pumps: An Overview", Pylarinos and Rogers, Department of Electrical and Computer Engineering University of Toronto, available on the webpage "www.eecg.toronto.edu/~kphang/ece1371/chargepumps.pdf". Further information on various other charge pump aspects and designs can be found in U.S. Pat. Nos. 5,436,587; 6,370,075; 6,556,465; 6,760,262; 6,922,096; 7,030,683; 7,554,311; 7,368,979; 7,795,952; 7,135,910; 7,973,592; and 7,969,235; US Patent Publication numbers 2009-0153230-A1; 2009-0153232-A1; 2009-0315616-A1; 2009-0322413-A1; 2009-0058506-A1; US-2011-0148509-A1; 2007-0126494-A1; 2007-0139099-A1; 2008-0307342 Al; 2009-0058507 Al; 2012-0154023; 2012-0154022; and 2013-0063118; and U.S. patent application Ser. Nos. 13/618,482; 13/628,465; and 13/886,066.

Figure 4:
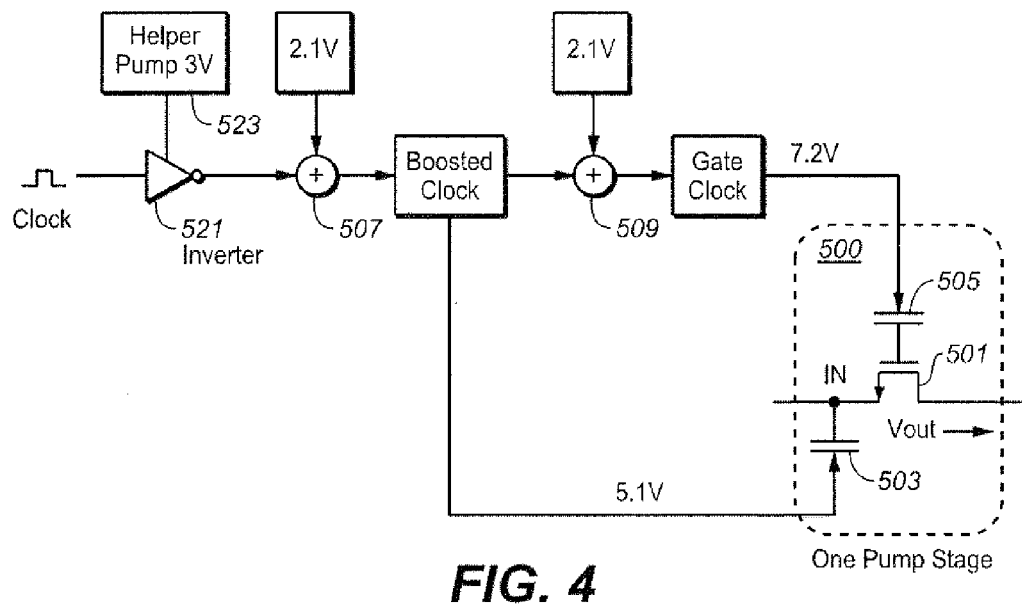
FIG. 4 is a schematic representation of an exemplary embodiment for a stage in a charge pump and associated clock generating circuitry using a helper pump.

FIG. 4 is an exemplary embodiment that illustrates a number of aspects in the context of a Vcc=2.1V example. The pump stage 500 is again formed of a transistor 501. A stage capacitor 503 and a gate capacitor 505, but the circuitry now involved in providing the boosted and gate clock signals now includes a helper pump. More specifically, rather than an input clock signal whose amplitude is Vcc supplied to the adder to 507, the input clock signal is now boosted by use of an auxiliary, helper pump 523. As discussed further with respect to FIGS. 5 and 6, the exemplary embodiment performs this initial boosting of the clock signal by way of an inverter 521. At the adder 507 this is again combined with the Vcc level to generate the boosted clock signal of, in this example, 5.1V supplied to the stage capacitor 503. The boosted clock is raised by another increment of Vcc at 509 to generate the gate clock for the gate capacitor 505 of the stage. The adders 507 and 509 can again be implemented by use of flying capacitors, for example.

The helper pump 523 is added to generate a 3V supply to feed into the clock doublers 507 and 509 to be able to gives the desired gate clock amplitude even with the reduced Vcc level without adding stages. If used with a higher Vcc value, such as 2.5V, the pump can be switched out. By use of the helper pump, the system can have the boosted clock 2.1V+3V=5.1V, compared to 5V in the circuit of FIG. 3 with VCC=2.5V. Similarly, the gate clock in FIG. 4 will have an amplitude of 2.1V+3V+2.1V=7.2V, compared to 7.5V in the circuit of FIG. 3 with VCC=2.5V. In order to get the same voltage at the gate of pass-gate transistor 501, the size of the gate capacitor 505 can be somewhat increased, where relatively larger capacitors can also be used for later stages. All though each stage could have its own auxiliary pump, it is generally preferable to use the same auxiliary pump in generating the boosted and gate clocks for all of stages or, if desired, for all of the stages of the same phase. Similarly, separate pumps could be used for the boosted clock and the gate clock; however, the use of more pumps is less efficient in terms of both area and power. The auxiliary pump (or, more generally pumps) can be small as its current requirements are relatively small. The boosted clocks and gate clocks are in phase, but non-overlapping as in at the rising edge, the boosted clock goes high first and then (for example, a couple of nanoseconds later) the gate clock goes high and at the falling edge, the gate clock goes low first and then the boosted clock goes low.

Figure 5:
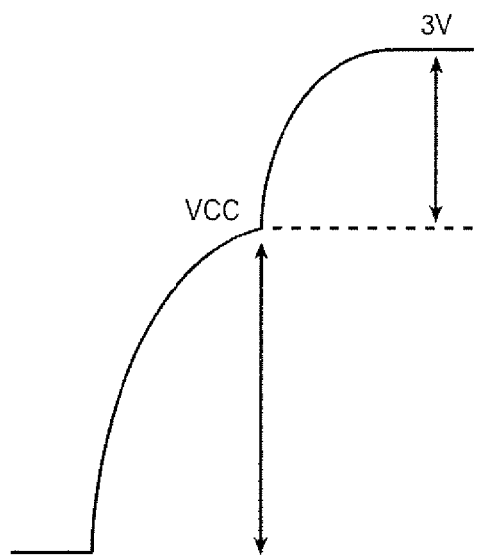
FIG. 5 illustrates a two-step boosting of a clock signal.
Figure 6:
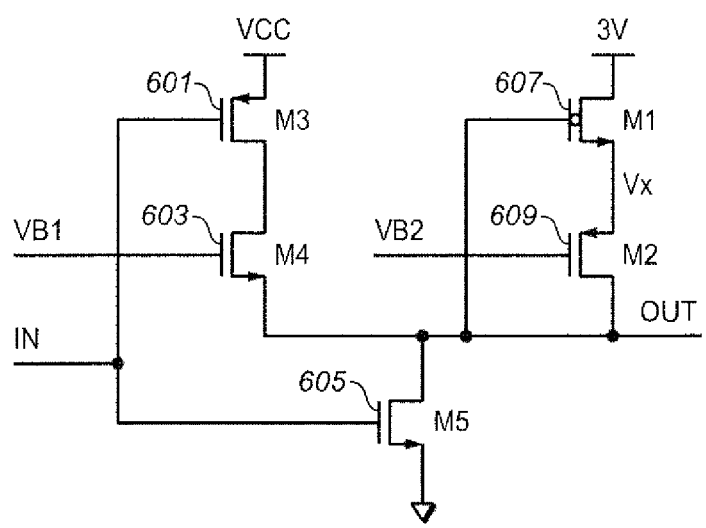
FIG. 6 is a schematic representation of an exemplary embodiment of an optimized inverter.

To maximize power efficiency, the system can reduce the current from the 3V pump supply by use of a segmented, multi-supply inverter as discussed with respect to FIGS. 5 and 6. Since clocks are highly swinging signals, it would be preferable if the system could charge up the clock node from 0V to VCC level using the VCC supply, and then for increasing this higher than VCC using the 3V supply, as illustrated schematically with respect to FIG. 5. This can minimize the current required from the 3V supply of the helper pump and thus increase the system's power efficiency. Additionally, as the current that the helper pump is asked to deliver is reduced, the helper pump can be designed with a smaller area and thus save on area as well. As an added advantage, as VCC varies, this scheme automatically tracks with the VCC level and maximizes the power efficiency.

FIG. 6 illustrates as exemplary embodiment for implementing an optimized inverter for providing the sort of behavior illustrated in FIG. 5. The input (such as the clock signal at left of FIG. 4) is connected to the gates of transistors PMOS M3 601 and NMOS M5 605 that are connected in series between Vcc and ground to provide the output, similarly to a more typical inverted where the OUT signal would then just be the inverted IN signal. In parallel with M3 601, connected between the raised pump output of (here) 3V and the OUT node, as NMOS M1 607, where M1 is a depletion device with Vt<0 that has its gate connected to the OUT node. Here the input voltage is a clock signal with a 0-VCC swing. The output voltage is also a clock signal, but with a 0-3V swing. Between M3 and the OUT node is NMOS M4 603 whose gate is set at a level VB1 that is biased in such a way to prevent leakage through M3 601 from the 3V supply to VCC when Vout>VCC. In the other leg, a PMOS M2 609 is connected between M1 607 and OUT, with a gate at VB2, that is biased in such a way to keep Vx higher than VCC so as to shut off the 3V supply when Vout<VCC. In the low-to-high transition at the output, initially, M1 607, M2 609 and M5 605 are off. M3 601 and M4 603 charge the output node to VCC. As soon as Vout reaches the VCC level, the 3V path turns on and the VCC path turns off. The combination of M1 607 and $M_2$ 609 turns into a positive feedback which raises the output voltage to 3V. In the high-to-low transition, M3 601 turns off first and M5 605 lowers the output voltage to less than VCC which turns the 3V path off as well, Eventually, the output voltage is lowered all the way to ground by M5 605. In this way, the circuit of FIG. 6 acts as a low voltage level shifter for the clock signal.

For the exemplary values used in the above discussion, to provide the same level of performance for the lower Vcc level as with the helper pump, but by instead adding extra high voltage pump stages would need two additional stages. Comparing the performance and area requirements of these two alternatives, with respect to power consumption, for the same performance, the scheme with 3V helper pump consumes significantly less power in ramp-up. In the regulation, it burns slightly more, however, with proper sizing optimization, the regulation current can be reduced. In terms of area increase, in a typical implementation, the area increase for the 3V helper pump is significantly less (~50%) than what is needed for adding 2 more high voltage stages to the pump system.

Consequently, of these two approaches to dealing with low Vcc levels, based on simulation and layout area comparison, the helper pump approach is the most efficient one in terms of both area and power. The helper pump implementation also requires the least amount of modification relative to the higher Vcc design, making the integration of the helper pump scheme into previous designs easier. Additionally, the use of the helper pump with the sort of inverter design illustrated with respect to FIG. 6 does not require any kind of hard switching when VCC varies and droops below 2.5V as it automatically tracks with VCC. This arrangement also adds the capability to modulate pump's strength/efficiency by modulating the bias levels VB1 and VB2 (FIG. 6) on silicon, lessening the need to design for the worst ease.

Although the invention has been described with reference to particular embodiments, the description is only an example of the invention's application and should not be taken as a limitation. Consequently, various adaptations and combinations of features of the embodiments disclosed are within the scope of the invention as encompassed by the following claims.

It is claimed:

1. A charge pump system comprising:
   a first stage, of one or more pump stages, including:
      a transistor connected between the an input and the an output of the first stage;
      a first capacitor having a first plate connected to a node between the first stage's input and the transistor, and having a second plate connected to receive a boosted clock signal; and
      a gate capacitor having a first plate connected to a gate of the transistor and a second plate connected to receive a gate clock signal, and
   clock generation circuitry connected to receive an input clock and a supply voltage and to generate therefrom the boosted clock signal and the gate clock signal, wherein the clock generation circuitry includes an auxiliary charge pump circuitry whose output is used in generating the boosted clock signal and the gate clock signal,
   wherein the gate clock signal is generated from the boosted clock signal, and
   wherein the clock generation circuitry further includes a voltage adder circuit connected to receive the boosted clock signal and the supply voltage and generate therefrom the gate clock signal.

2. The charge pump system of claim 1, wherein the voltage adder circuit includes a flying capacitor.

3. A charge pump system comprising:
   a first stage, of one or more pump stages, including:
      a transistor connected between the an input and the an output of the first stage;,
      a first capacitor having a first plate connected to a node between the first stage's input and the transistor, and having a second plate connected to receive a boosted clock signal; and
      a gate capacitor having a first plate connected to a gate of the transistor and a second plate connected to receive a gate clock signal, and
   clock generation circuitry connected to receive an input clock and a supply voltage and to generate therefrom the boosted clock signal and the gate clock signal, wherein the clock generation circuitry includes an auxiliary charge pump circuitry whose output is used in generating the boosted clock signal and the gate clock signal,
   wherein the gate clock signal is generated from the boosted clock signal,
   wherein the auxiliary charge pump circuitry is used to increase an amplitude of the input clock, and
   wherein the clock generation circuitry further includes a voltage adder circuit connected to receive the input clock with the increased amplitude and the supply voltage and generate therefrom the boosted clock signal.

4. The charge pump system of claim 3, wherein the voltage adder circuit includes a flying capacitor.

5. A charge pump system comprising:
   a first stage, of one or more pump stages, including:
      a transistor connected between the an input and the an output of the first stage;
      a first capacitor having a first plate connected to a node between the first stage's input and the transistor, and having a second plate connected to receive a boosted clock signal; and
      a gate capacitor having a first plate connected to a gate of the transistor and a second plate connected to receive a gate clock signal, and
   clock generation circuitry connected to receive an input clock and a supply voltage and to generate therefrom the boosted clock signal and the gate clock signal, wherein the clock generation circuitry includes an auxiliary charge pump circuitry whose output is used in generating the boosted clock signal and the gate clock signal,
   wherein the gate clock signal is generated from the boosted clock signal,
   wherein the auxiliary charge pump circuitry is used to increase an amplitude of the input clock, where the auxiliary charge pump circuitry comprises a first auxiliary charge pump and wherein the clock generation circuitry includes an inverter circuit connected between an output of the first auxiliary charge pump and ground, the inverter circuit having as input the input clock and having as output an inverted form of the input clock with the increased amplitude, and
   wherein the inverter circuit includes:
      a first PMOS transistor connected between an input for the supply voltage and an output node from which the output of the inverter circuit is supplied;
      a first NMOS transistor connected between the output node and ground, wherein the input of the inverter circuit is connected to a control gate of the first PMOS transistor and the first NMOS transistor; and
      a depletion type NMOS transistor connected between the output of the first auxiliary charge pump and the output node and having a gate connected to the output node, wherein the output of the first auxiliary charge pump is the output of the auxiliary charge pump circuitry.

6. The charge pump system of claim 5, wherein the inverter circuit further includes:
   a second NMOS transistor connected between the first PMOS transistor and the output node and having a gate biased to prevent the output of the first auxiliary charge pump from leaking therethrough to the input for the supply voltage.

7. The charge pump system of claim 5, wherein the inverter circuit further includes:
   a second PMOS transistor connected between the depletion type NMOS transistor and the output node and having a gate biased to maintain a node between the second PMOS transistor and the depletion type NMOS transistor higher than the supply voltage.

* * * * *